United States Patent Office 3,477,862
Patented Nov. 11, 1969

3,477,862
MARKING MEDIUM
William A. Forsyth, Jr., Meadowbrook, Pa., assignor to Honeywell, Inc., Minneapolis, Minn., a corporation of Delaware
No Drawing. Filed June 16, 1967, Ser. No. 646,476
Int. Cl. C09d 11/00
U.S. Cl. 106—22                                5 Claims

ABSTRACT OF THE DISCLOSURE

An ink comprising a dyestuff, a solution of polyethylene oxide and glycerin for employment in a pen, nozzle or other ink applying means to insure the inscription of a clear continuous solid line on a chart on which the ink applying means is associated as the ink applying means traverses the chart in, for example, a stepped, sinusoidal or other manner at recording speeds up to and/or exceeding forty inches per second.

---

Ink systems which rely on the capillary action taking place in a capillary tube to draw ink from an ink supply into and through a reservoir and a pen unit and then onto a chart work satisfactorily at recording speeds which do not exceed forty inches per second because the demand of the ink required by the chart at the tip of the pen in order to make a clear continuous solid line thereon at these speeds is not very large.

When a capillary system of this type is employed for recorder pens whose pen speed across a chart exceeds forty inches per second the ink flow provided by this system is not sufficient to allow the pen to inscribe a continuous line on the chart because thinning of the ink line occurs, a non-continuous ink line inscription on the chart thereafter takes place and pen skipping occurs.

It is an object of the present invention to overcome this pen skipping trouble by providing a unique ink for the aforementioned ink system which will have substantially the same viscosity as the presently available commercial inks but will possess a much higher elastic strength than these commercial inks.

It is another object of the present invention to provide a unique relatively low viscosity-high elastic strength ink of the aforementioned type than can be used in high speed pens to inscribe a continuous line on a chart. This is possible because once the pen places molecules of this unique ink on the chart the ink on the chart will pull succeeding molecules from the pen tip through the capillary tube when there is any relative movement between the pen tip and the chart.

It is another object of the present invention to provide a unique ink of the aforementioned type that will continuously apply an ink line to a chart paper at high speeds even when the center line of the pen applying the ink is not ideally positioned so it is the perpendicular bisector of the chart drum that is adjacent to the pen and the chart paper.

It is another object of the invention to provide a unique ink mixture which is comprised of a polyethylene oxide dissolved in water, glycerin and dyestuff.

One of the problems encountered with inks that have heretofore been used in inking systems using capillary tubes is that an undesired excessive flood of ink flows from the ink reservoir through the capillary and pen onto a chart when the reservoir is located only a slight distance above the level of the pen tip location and an undesired starving low flow of ink passing from the reservoir through the pen onto a chart occurs when the position selected for the reservoir is located only a slight distance below the level of the pen tip location.

It is therefore a further object of the present invention to provide an ink whose elastic properties allow it to maintain a desired substantially uniform rate of flow from a reservoir through a capillary and pen onto a chart even though the reservoir is located at a position that is substantially above or substantially below the level of the pen tip.

When pens are left idle for too long a period of time on a chart the commercially available present day ink which these pens employ form a large spot on the chart. To prevent this from happening it has been the practice to use pen lifters to hold the pen off the paper until it again performs a recording operation. In this lifted position the ink in the pen tip has a tendency to dry out since it is exposed to the atmosphere.

It is therefore another object of the invention to provide an ink which can be used in a pen that is left in an idle position on a chart without forming an undesired spot thereon and which will therefore have less tendency to be dried out by the atmosphere surrounding the ink in the pen since no pen lifting operation is required.

In accomplishing these and other objects, there has been provided in accordance with the present invention, an ink mixture which comprises a high molecular weight polyethylene oxide dissolved in water, with an additive of glycerin, and including sufficient dye-stuff to produce a desired color density of resultant ink mixture.

In a preferred embodiment of the invention, an ink mixture consists, essentially, of about 2 percent red dyestuff, about 13 percent glycerin, and the remaining 85 percent comprising a solution of 0.17 to 0.23 percent by weight of high molecular weight polyethylene oxide in distilled water.

In another preferred embodiment, a purple dye-stuff is substituted for the red dye-stuff. However, it has been found that about 0.3 percent of the purple dye-stuff is sufficient. Again, about 13 percent glycerin is included. This leaves the remaining 86.7 percent made up of the aforementioned solution of polyethylene oxide and water.

The preferred polyethylene oxide which is used in the aforementioned ink mixtures is of a high molecular weight, on the order of 4,000,000 and preferably is one which is commercially known as WSR301, manufactured by Union Carbide.

It should be understood that the polyethylene oxide used in the aforementioned ink mixtures can also be of a low molecular weight, on the order of 600,000, such as the polyethylene oxide known commercially as WSR205 also manufactured by Union Carbide. It should be further understood, however, that whereas from .17 to .23% by weight of the heavier oxide provides a desirable mixture, from 5 to 10 percent by weight of the lower molecular weight type of polyethylene oxide should be used in the ink mixture to obtain as equivalent good clear continuous line recording results as those that are obtained with the high molecular polyethylene oxide.

Although a preferred amount of glycerine is specified for each of the aforementioning mixtures, experimentation has shown that as long as the percentage of glycerin in the ink is retained between 12 to 14 percent the ink will not dry out if it is stored in an idle pen for too long a time, such as overnight.

The previously mentioned red dyestuff is preferably a commercially available Fast Crimson GR Concentrate X2 150 percent which is manufactured by the National Aniline Division of Allied Chemical.

The previously mentioned purple dyestuff is preferably a commercially available methyl violet which is manufactured by the Colman and Bell Co.

The quantity of either of the aforementioned dyestuffs is not an important element in the respective ink mixes in that it can be varied over relatively wide ranges. The upper limit of the dye concentration selected will be determined by the actual percentage of the dye to the quantity of ink mix being produced. The lower limit of the percentage of dyestuff that is used is dictated primarily by the intensity of the trace on a chart that is desired. Experimentation has shown that in order to obtain a good measurable trace on a chart it is preferable to add the concentration of dye previously referred to to make up at least 2 percent of the red dye and at least .3 percent of the purple dye when any size batch of ink mixture is formulated.

Although only two specific types of dyestuffs are referred to herein it should be understood that other colored dyestuffs than those mentioned could be utilized to obtain additional colored inks having the same advantages as those previously described.

The unique relatively low viscosity-high elastic strength which is inherent in the ink mix disclosed herein is because the ink has a high degree of cohesion which is a function of surface tension. Furthermore, the satisfactory viscosity of the ink (4 to 20 centipoise) is approximately four to four and one half times as viscous as conventional inks.

One of the unusual characteristics of this ink mix is that a great deal less force is required to move a long stream of this ink than is required with present day conventional inks because it has the inherent tendency to pull itself from the interior of a pen to a chart on which it is recording a record.

The elastic properties of the ink previously described is obtained by first dissolving polyethylene oxide in distilled water to form a solution, mixing the desired aforementioned amounts of glycerin in the solution and mixing the aforementioned amounts of dye with the other ingredients for a period of time which will thoroughly mix the ingredients but which will not destroy the unusual elastic strength characteristic which this ink mixture possesses.

When, for example, 100 ccs. of the ingredients from which the ink is to be made are placed in a glass beaker containing a magnetic stirrer experimentation has shown that the ingredients of this ink will be thoroughly mixed to the desired consistency without destroying its plastic strength after a half hour of stirring has taken place.

This selectively timed mixing operation is necessary because the special elastic properties of the ink enable the ink to flow through the ink applying means onto the chart paper automatically at a higher flow rate when the traversing speed of the ink applying means is increased and to reduce the ink to low flow rate when the traversing speed of the ink applying means is decreased.

Another advantage possessed by the unique mixture disclosed herein is that a pen containing this unique ink can be lifted to an inactive non-recording position away from the chart for an extended period of time, such as overnight, and returned to its recording position on the chart and the ink in the pen at that time will again readily flow through the pen onto the chart.

The selected percentage of glycerin with the other ingredients in the ink thus makes fast starting recording possible after the pen has been lifted from the chart and re-engaged with the chart. Use of this unique ink will thus eliminate the time consuming dried out ink clogging pen problem which is presently encountered with pens which use other commercially available ink.

The embodiments of the invention in which an exclusive property or privilege is claimed are defined as follows:

1. An aqueous ink mixture consisting essentially of a water solution of a dye-stuff in sufficient quantity to produce a desired color intensity, glycerin and a polyethylene oxide polymer selected from the group having a molecular weight of 600,000 or 4,000,000 in a quantity to produce an overall viscosity of about 4 to 20 centipoises.

2. The ink mixture defined in claim 1 wherein substantially 0.17 to 0.23 percent of the solution is comprised of said polyethylene oxide of said 4,000,000 molecular weight.

3. The ink mixture defined in claim 2 wherein substantially .3 to 2 percent of the mixture is comprised of the dye-stuff.

4. The ink mixture defined in claim 3 wherein substantially 12 to 14 percent of the mixture is comprised of glycerin.

5. An ink for use in an ink reservoir and a pen connected by way of a capillary tube to the reservoir to apply a record to a recording medium when the ink in the reservoir is a different level than the tip of the pen, said ink comprising .3 to 2 percent dye-stuff, 12 to 14 percent glycerin and .17 to .23 percent of a solution of polyethylene oxide polymer having a molecular weight of about 4,000,000.

References Cited

UNITED STATES PATENTS 2,821,821    2/1958    Yen _____ 106—22 XR
2,771,372    11/1956    Chambers et al. _____ 106—22

FOREIGN PATENTS 1,238,936    4/1967    Germany.

DONALD J. ARNOLD, Primary Examiner

JOAN B. EVANS, Assistant Examiner

U.S. Cl. X.R.

106—23